United States Patent [19]

Hyers

[11] Patent Number: 5,933,668
[45] Date of Patent: Aug. 3, 1999

[54] CAMERA MOUNTING APPARATUS

[76] Inventor: Jon W. Hyers, 15 E. Elizabeth St., St. Paul, Minn. 55107

[21] Appl. No.: 08/967,860

[22] Filed: Nov. 12, 1997

[51] Int. Cl.$^6$ .................................................... G03B 17/24
[52] U.S. Cl. ............................ 396/392; 396/332; 396/428
[58] Field of Search .......................... 348/42, 47; 352/57, 352/70, 85, 243; 396/58, 322, 325, 329, 332, 419, 428

[56] References Cited

U.S. PATENT DOCUMENTS 2,417,446  3/1947  Reynolds .................................... 348/47
4,418,993  12/1983  Lipton ....................................... 352/57

OTHER PUBLICATIONS

ParkerVision brochure CameraMan System II 1–CCD General Pan/Tilt Camera systems.
Ultimatte Corporation brochure Ultimatte Memory Head.
ParkerVision brochure CameraMan System II 3–CCD General Pan/Tilt Camera systems.
ParkerVision brochure CameraMan Shot Director.

*Primary Examiner*—David M. Gray
*Attorney, Agent, or Firm*—Angenehm Law Firm, Ltd.; N. Paul Friederichs

[57] ABSTRACT

An optical image matching apparatus and method of use, including mechanism for mounting an optical instrument, mechanism for syncromoniously moving a plurality of optical instruments, said mechanism further including mechanism for fixedly connecting two optical instruments and mechanism for moving the connecting mechanism, and mechanism for altering the rate of rotation of each optical instrument with respect to other optical instruments.

17 Claims, 11 Drawing Sheets

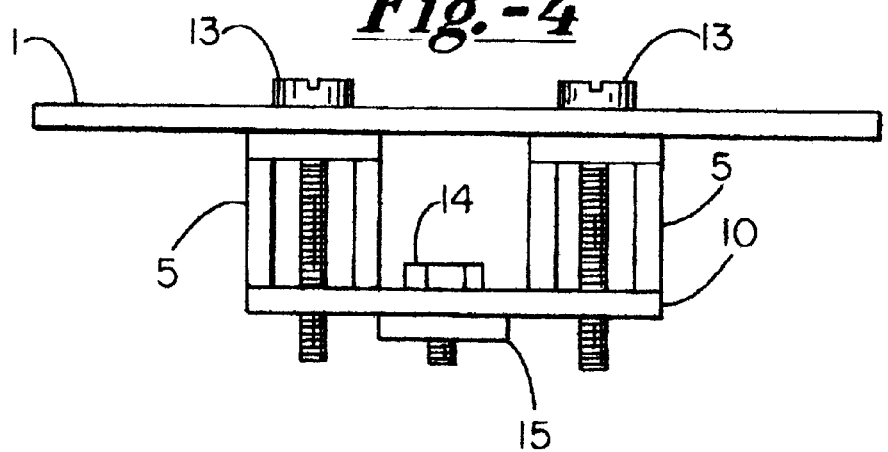
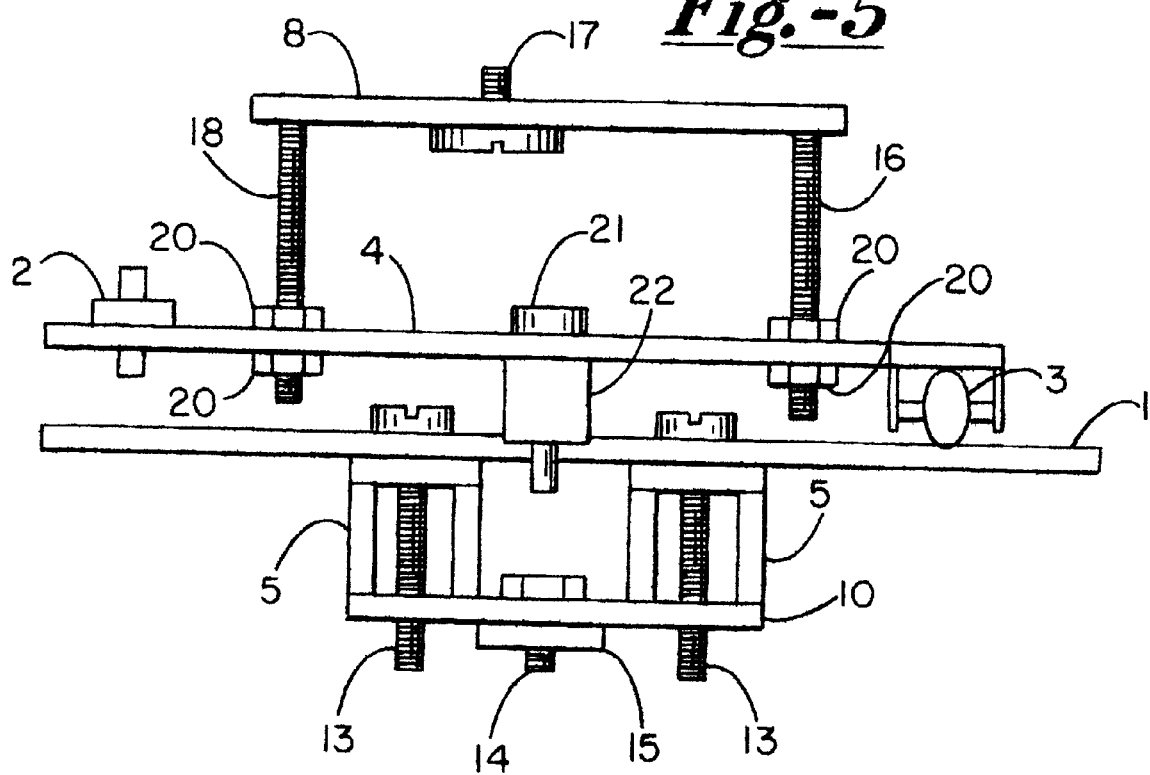

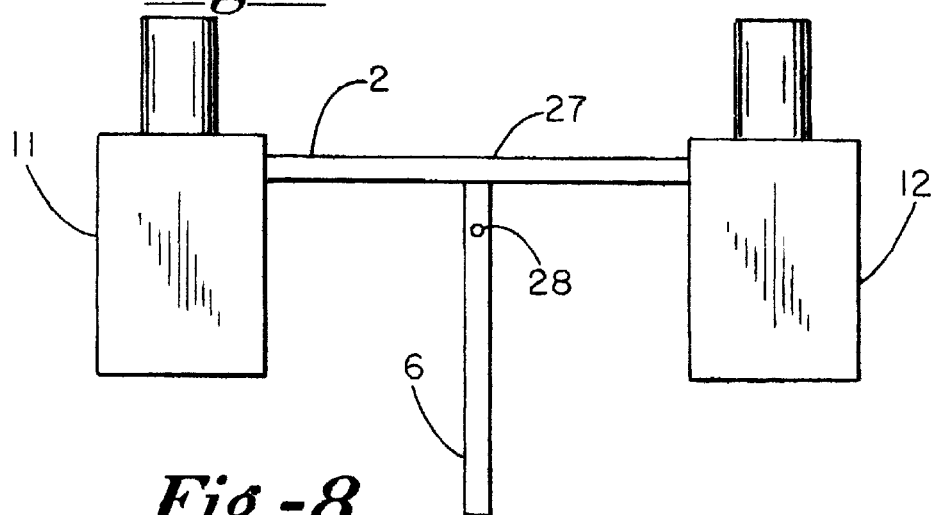
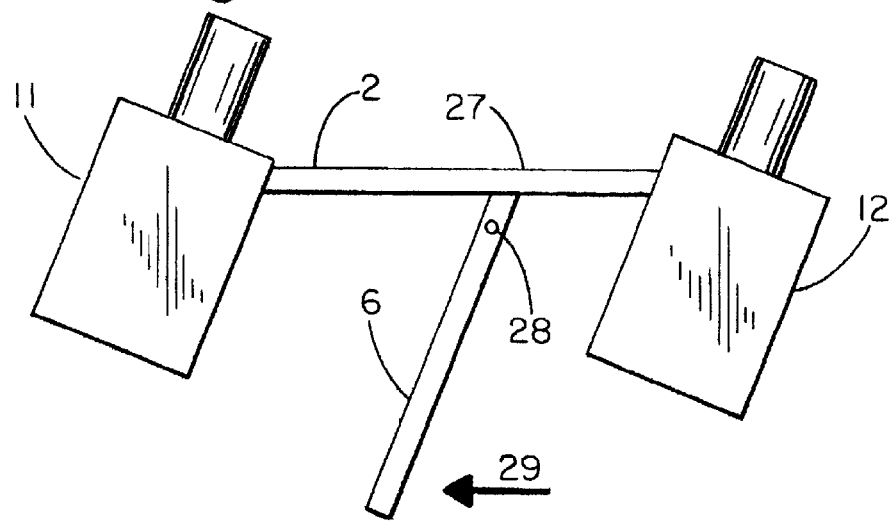
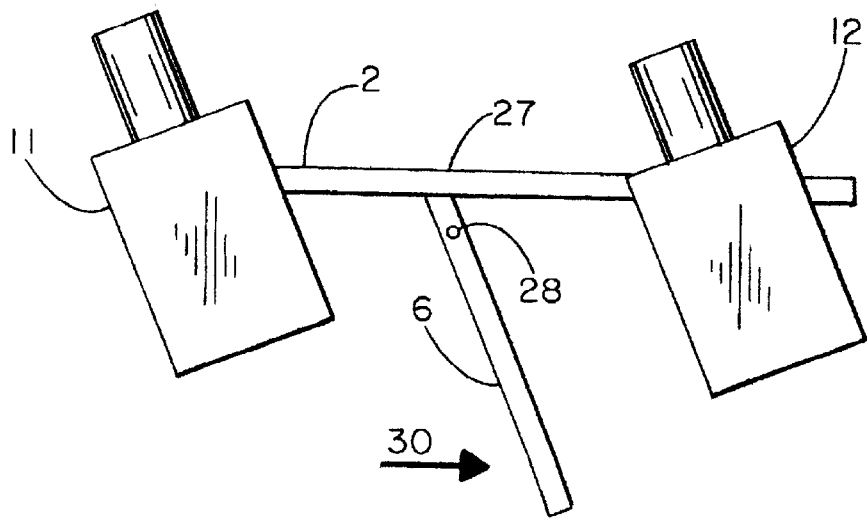

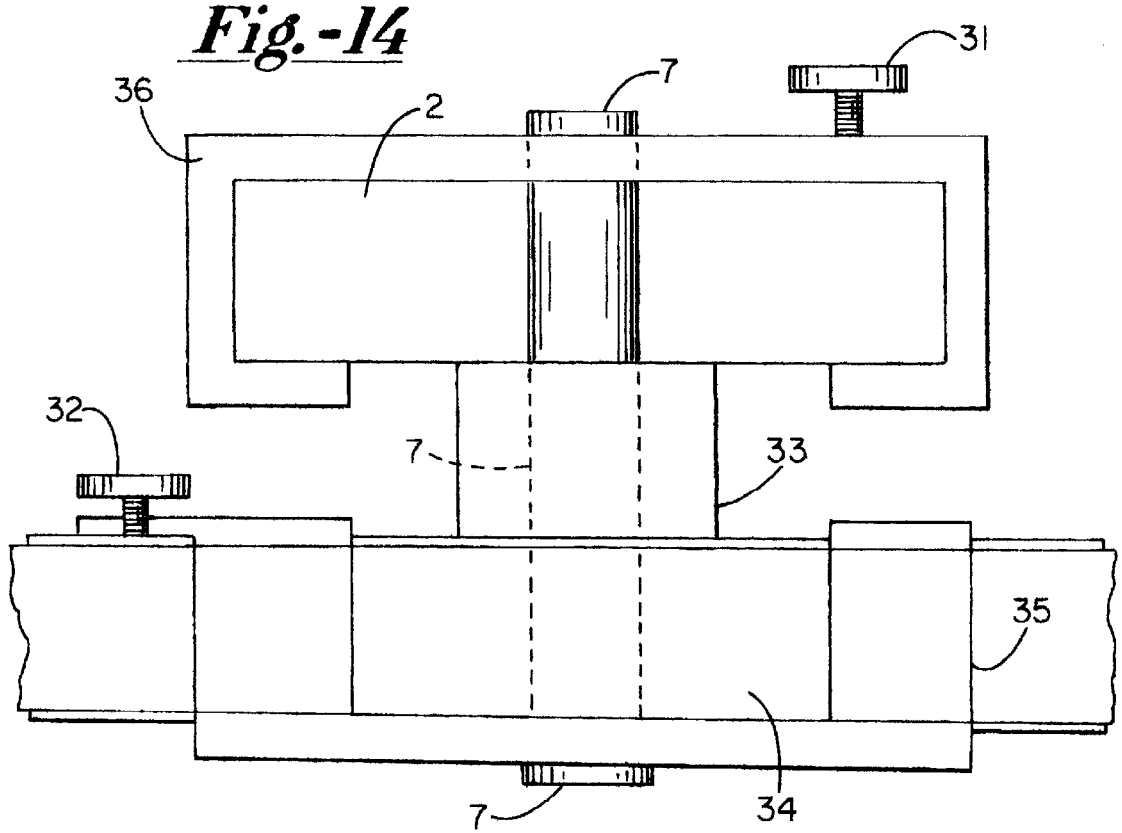
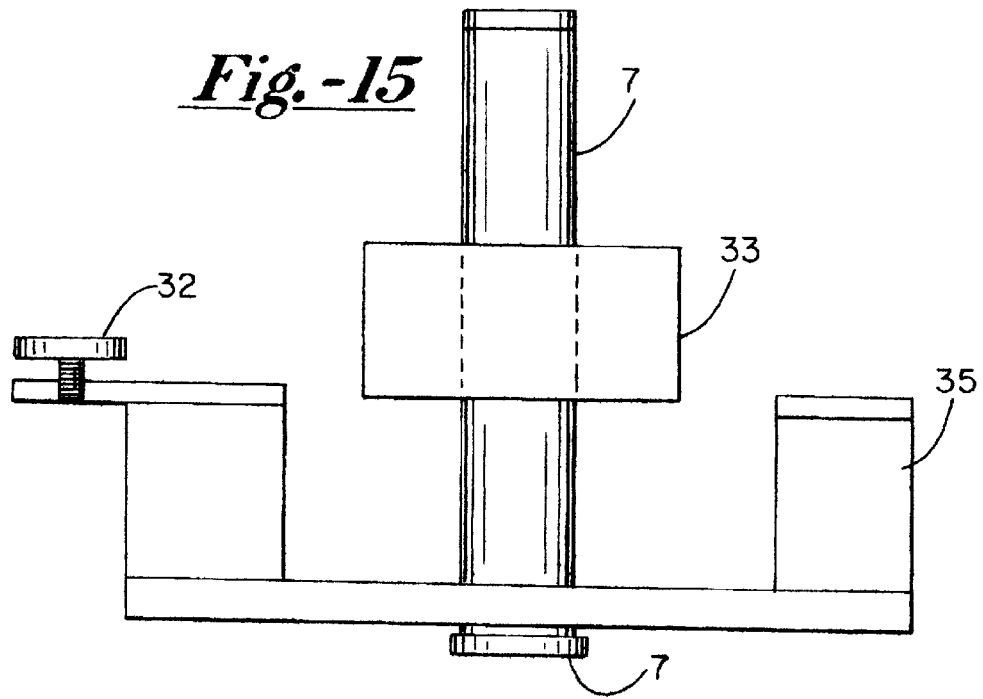

CAMERA MOUNTING APPARATUS

FIELD OF THE INVENTION

This invention relates to camera equipment and more particularly to special effects equipment, including equipment for motion and position control of cameras.

BACKGROUND OF THE INVENTION

Camera equipment has evolved through the years from the old pinhole cameras to the very sophisticated equipment of today. During this time there has been an ever increasing desire to produce photographic, videographic or cinematic special effects, while keeping cost effectiveness of the equipment and technique in mind.

Various camera techniques including chromakeying, luminous keying, and double exposures. These techniques involve the use of two cameras simultaneously, the images of which are combined into a single image. Alternatively, the seperate images can be shot with the same camera with the images combined into a single image.

Before now the equipment needed for these functions have been extremely complicated and expensive. These techniques were limited to those commercial production houses that had sufficient finances and trained personnel for expensive and complex equipment. What is needed in the industry is a simplified piece of equipment and methodology for carrying out these various filming techniques. The simplified method and equipment should be designed to be used by the amateur or beginning enthusiast, yet maintain the high quality of production experienced by the commercial production houses.

SUMMARY OF THE INVENTION

The manually operated dual camera image matching method and apparatus of this invention have several distinctly different embodiments, all of which will be described herein. According to the present invention, it has been found that a dual, side-by-side panning (horizontal rotation movement) device, utilizing any panning mechanisms common to any camera tripod, can be linked together with the addition of a push arm and panning mechanism extension levers. This panning device will cause both panning mechanisms to operate in unison. The resulting effect of linking the two panning mechanisms allows the video cameras to rotate at the same rate of speed, facing in the same direction, at the same time providing simultaneous and synchronous movement of the two cameras for a variety of special effects.

According to a second embodiment, one of the extension levers and adjoining end of the push arm can together be provided with an adjustable pivot axis, which allows the camera supported thereby to be positioned in parallel with the other camera, but alternatively in alignment with, longitudinally ahead of or longitudinally behind the other camera (with reference to the subject being photographed). In this embodiment, the two cameras can be operated either in absolute synchronous movement, with the two video cameras with identical zoom (field of view) settings or with differing panning rates between the left and right cameras, in order to allow apparently identical panning rates with different zoom settings on each camera.

A third embodiment of the apparatus and method for dual camera image matching is achieved with the addition of an optional accessory motion reversing push arm extension, whereby the orientation of the cameras may be changed from both cameras forward to the right camera forward and the left camera backward, to increase the total panned field of view and decrease the occurrence of either camera filming the other camera.

According to yet another embodiment, the apparatus of this invention may be configured to be used with existing tripod heads in place of the tripods own panning device as illustrated in FIG. 6, using an adapter to fasten the invention to the tripod head. Other motion alignment uses of the apparatus and method of this invention will become more apparent to those of skill in this art upon a reading of the following specification and claims, considered and interpreted in view of the accompanying drawings.

The uses of the apparatus and method of this invention include, but are not limited to, chromakeying, luminous keying, and double exposures, of two video camera images. While the apparatus and method of the present invention are suitable for use with video cameras, they may also be used with motion picture film cameras, with still cameras, with telescopes and with other optical devices. By using motion picture film cameras, filming the same scene with different cameras can be accomplished. With still photographic cameras, the same scene can be photographed with two cameras. With two telescopes, the two telescopes can be synchronized to aim to exactly the same location. The primary benefit of this method and apparatus of the present invention is the ability to perform synchronous movement of two video cameras in panning, tilting or otherwise moving them, using the three previously mentioned double-image video special effects, including chromakeying, luminous keying and double exposures.

Chromakeying combines two video images as a foreground and background image. An example is when a TV news weather caster is filmed against a blue or green backdrop. A common video device known as a chromakeyer removes the chosen color (green or blue) and replaces it with another video image (such as a weather map) which now appears to be behind the newscaster. Keying on the referenced color, the device combines the two pictures as a distinct foreground and background, pulling the background image from a videotape player, graphic computer or second video camera filming the background scene thus making them appear as though they were filmed together with one camera.

Luminous keying combines two video images as a foreground and background image. The key shape is based upon the brightness or luminous level of the foreground image not on the color of the background as with chromakeying. The present method and apparatus can also be used in filming two video camera images simultaneously (e.g., double exposures).

The following is an example of a suitable use for the present method and apparatus. A first video camera shoots the background image in the form of a miniature scale set or an object, a painting, or a projection. The second video camera films the foreground subject. This invention allows for matched panning movement during a scene, increasing the realism of the scene by eliminating the creative problems known in the video industry as tell-tale locked down camera look. This appearance is where the camera does not move and there is a noticeable lack of camera movement. This problem is considered by the industry as self revealing special effects, an aspect of special effects that is undesirable.

It has further been found that if the Manually Operated Dual Video Camera Pan/Tilt Motion Matching Apparatus of this invention is mounted on a standard tripod, the tilt function of the tripod may be used in combination with the present apparatus to provide simultaneous and synchronous tilt motion with both cameras and in the resulting composite scene. Because video production is considered to be the primary medium that will use this invention, the accompanying drawings and descriptions will center around this use. However, it is to be understood that the apparatus and method of this invention are equally applicable to use with still photographic cameras, motion film cameras, video cameras, telescopes and with any other optical equipment.

IN THE DRAWINGS

FIG. 4 is a partial cross-sectional view showing the framework that supports the cameras and panning mechanisms;

FIG. 5 is a partial cross-sectional view, similar to that shown in FIG. 4, with the panning mechanism and adjustable camera mounting plate added;

FIG. 7 is an elevational view showing both cameras aimed and focused straight ahead;

FIG. 8 is a an elevational view, similar to FIG. 7, in which both cameras are panned to the right;

FIG. 9 is a an elevational view, similar to FIG. 7, in which both cameras are panned to the left;

FIG. 14 is a partial cross-sectional view of the pivot joint between the left camera panning mechanism extension lever and the push arm, showing the adjustable slide plates which attach to the pivot pin;

FIG. 15 is a partial cross sectional view, similar to that shown in FIG. 14, of just the lower slide plate of the extension lever, with some elements removed for clarity;

DETAILED DESCRIPTION OF THE INVENTION

Figure 1:
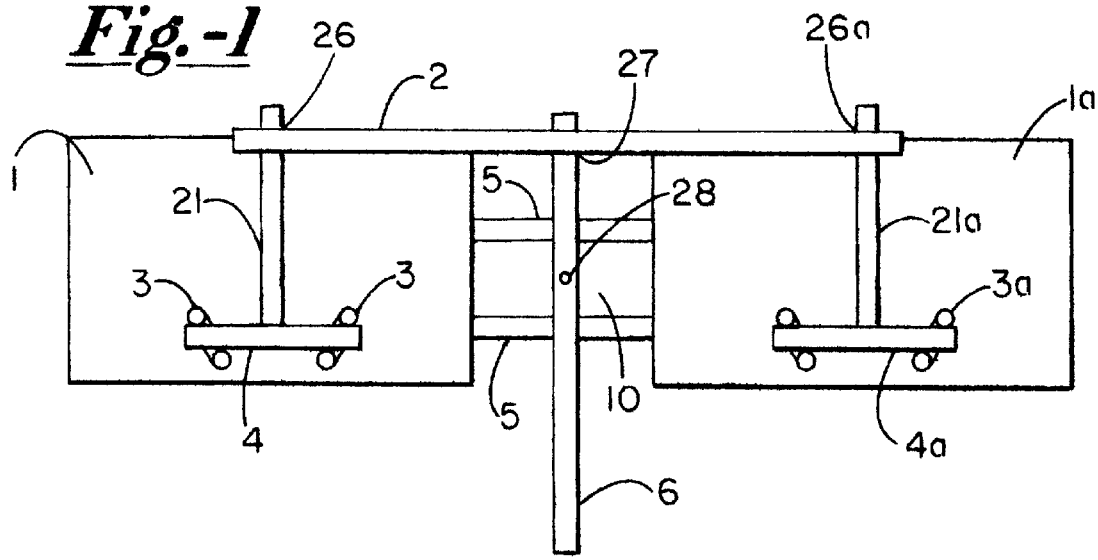
FIG. 1 is an elevational view showing the invention without cameras or mounting plates.

FIG. 1 shows an elevational view of the manually operated dual video camera pan/tilt motion matching apparatus of this invention without cameras or mounting plates in place. The camera supports and panning mechanism may be mounted on the base plates 1, 1a. The push arm 2 mechanically links the left and right camera panning mechanism frameworks 4 and 4a at pivot joints 26 and 26a. Roller sets 3 and 3a to provide smooth panning motion about panning axis 21 and 21a. Control handle 6 rotates on pivot pin 28 and connects with the push arm 2 via sliding pivot joint 27. Bars 5 support the entire apparatus. Bars 5 may be U-bars, I-Beams or any other support frames and may be formed of any material.

Figure 2:
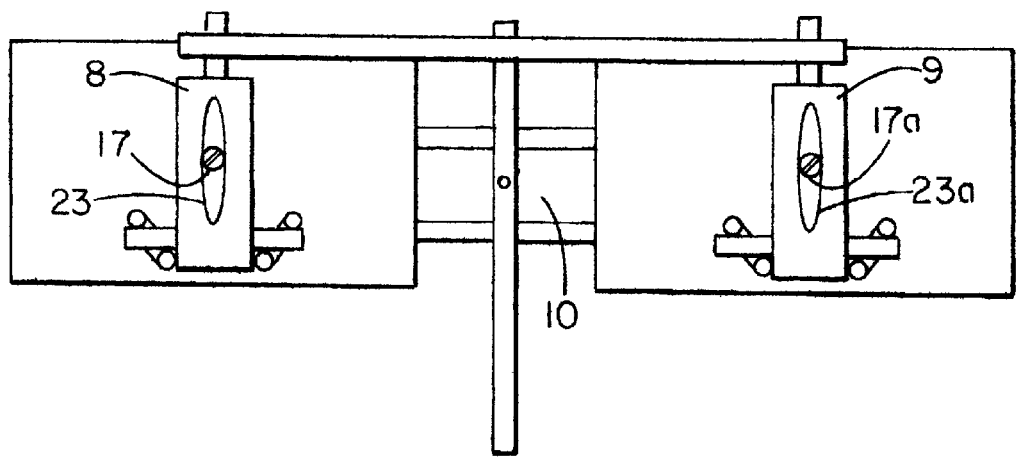
FIG. 2 is a view, similar to that shown in FIG. 1, and showing the mounting plates in place.

Turning now to FIG. 2, base plate 10 may be attached underneath support bars 5 to provide additional structural integrity. Camera mounting plates 8 and 9 with mounting screws 17 and 17a are shown in place above the respective camera panning mechanism frameworks 4 and 4a.

Figure 3:
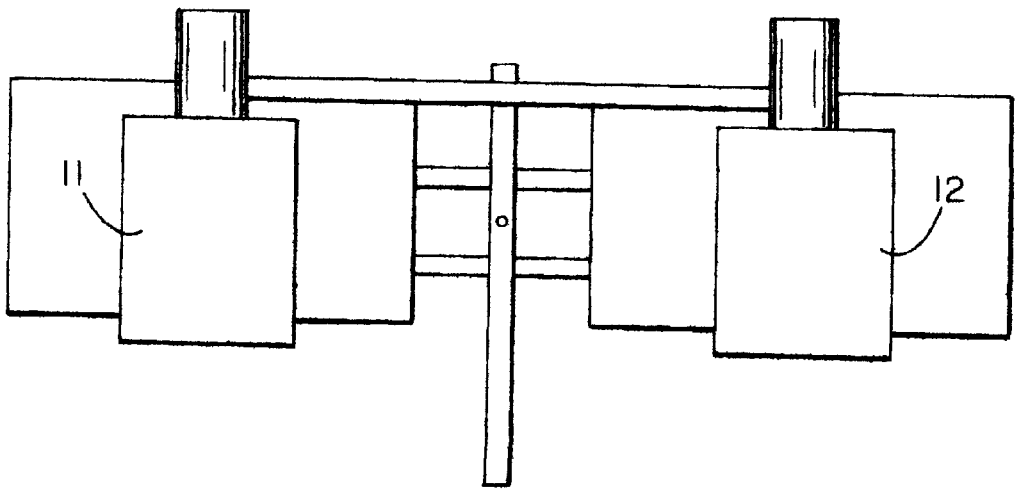
FIG. 3 is a view, similar to that shown in FIGS. 1 and 2, and showing the cameras in place.

In FIG. 3, two cameras 11 and 12 are shown mounted in their correct configuration on top of mounting plates 8 and 9.

FIG. 4 is a partial cross-sectional view of the support framework of the motion matching apparatus. Bolts 13 hold baseplate 1 to bars 5 and to bottom base plate 10. A standard tripod-to-camera mounting plate 15 is shown secured to bottom base plate 10 by bolt 14.

FIG. 5 illustrates the camera support and panning mechanisms in position on the upper surface of base plate 1, without the camera. Note that the left camera mounting mechanism and the right camera mounting mechanism are identical. For simplicity, FIG. 5 will be described with reference to the left camera 11, however, it is to be understood that the description applies equally to the right camera 12. FIG. 5 shows only one of these two mounting mechanisms. The camera 11 is positioned on the upper surface of mounting plates 8. Mounting screw 17 attaches camera 11 to mounting plate 8. Camera mounting plate 8 is attached on the upper surface of camera panning mechanism frameworks 4 by adjustable height support screws 16, 18, respectively. Adjustable nuts 20 may be moved up or down in order to adjust the height of either or both cameras 11, 12 to achieve correct alignment of the image necessary for synchronous movement in tilting, e.g., tipping forward or backward. Support block 22 or cylindrical nylon spacer 22 and panning axis rod 21 represent any type of panning mechanism used in commercial video or film tripods. Panning mechanisms generally include friction head, such as QuantaRay QTR-950; fluid head, such as Bogen 116; and bearing head, such as Quick Set Cam Link, panning mechanisms. FIG. 5 shows the employment of a friction head type panning mechanism whereby panning axis rod 21, in the form of a wide-head bolt, holds the panning mechanism frameworks 4, 4a to the base plate 1. Roller assembly 3, which may be any small precision wheel, caster or roller, provides smooth panning movement and extra weight support in the friction head configuration. When a bearing head or fluid head panning mechanism is used as the panning mechanism frameworks 4, 4a, the roller assembly 3 is generally considered optional, since these types of panning mechanisms are considered typically stronger and more stable.

Figure 6:
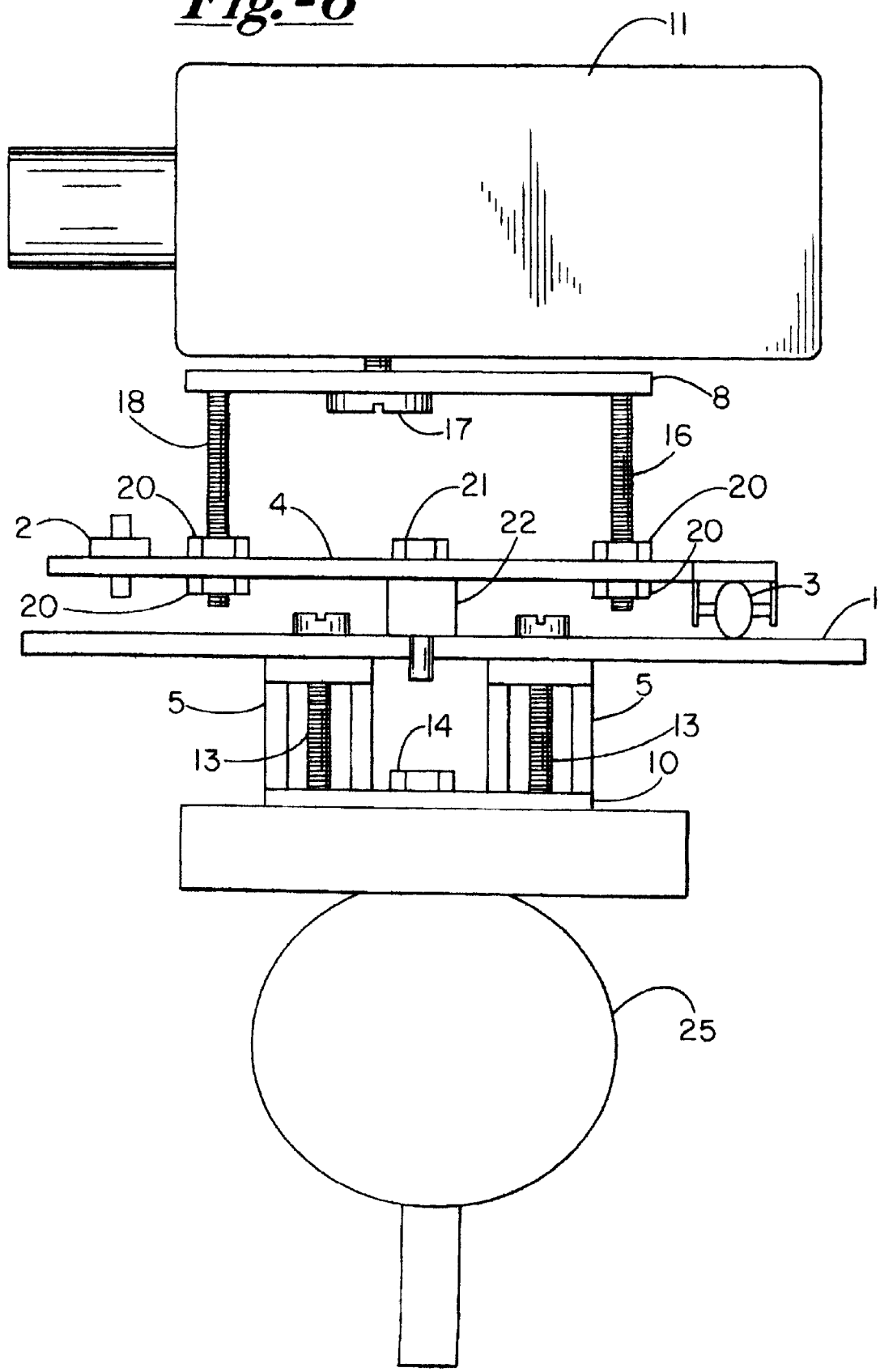
FIG. 6 is a partial cross-sectional view of one camera support showing the typical usage configuration of the device with a camera in place, and the device mounted on a standard video tripod.

FIG. 6 shows a camera 11 in place on the upper surface of camera mounting plate 8. The adjustable camera mounting screw 17 may slide forward and backward through a slit 23 in plate 8. This allows the cameras 11, 12 to be slid forward and backward. Utilizing the height adjustment system, comprising adjustable height support screws or bolts 16 and 18 and nuts 20, the cameras 11, 12 can be raised and lowered. These adjustments allow for correct alignment of the image for synchronous movement in panning or tilting. The elimination of these adjustments could limit the ability of the apparatus of this invention to match movement in the two camera images, resulting in an apparent sliding of one image relative to the other. The apparatus of this invention is illustrated in FIG. 6 sitting on the upper surface of any medium or heavy weight video or film tripod 25, such as a BOGEN 3068 tripod with #116 head.

FIGS. 7–9 are partial elevational views which show the cameras 11, 12 oriented forward when the control handle 6 is facing forward or perpendicular to the push arm 2. FIG. 8 demonstrates the cameras 11, 12 panning right as the control handle 6 is moved to the left 29. FIG. 9 demonstrates the cameras 11, 12 panning left as the control handle 6 is moved to the right 30.

Figure 10:
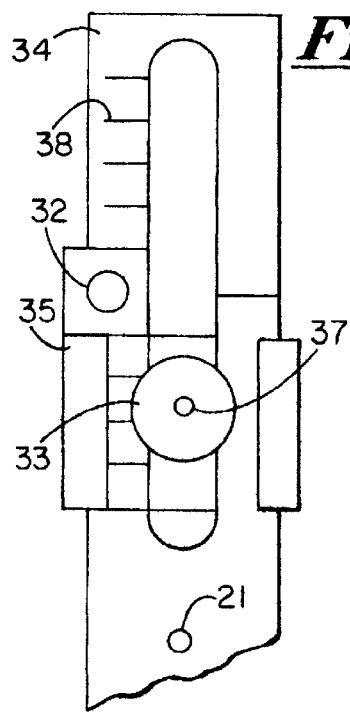
FIG. 10 is an elevational view showing the extension lever of the left camera panning mechanism with an adjustable pivot point-slide plate.
Figure 11:
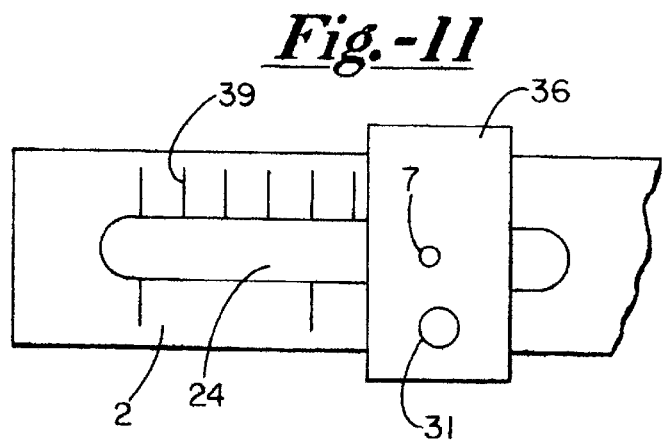
FIG. 11 is an elevational view, showing the left side of the detached push arm with an adjustable slide plate.

FIGS. 10 and 11 are close-up elevational views of the connecting ends of the extension lever 34 and the push arm 2 of the panning mechanism 4 for the left camera 11. Calibration marks 38 and 39 aid in using the apparatus and method of this invention when making adjustments in panning rate on the left camera 11. The center of panning rotation 21 of the left panning mechanism 4 is visible in FIG. 10. The pan axis of rotation 21 is the rod about which pan mechanism framework 4 rotates. Adjustable slide plate 36 of push arm 2 is connected to extension lever 34 to its adjustable slide plate 35, via pin 7 in hole 37. Adjustable slide plate 36 sits on top of grommet washer 33, which sits on extension lever 34 to provide smooth pivot rotation between 2 and 34.

Figure 12:
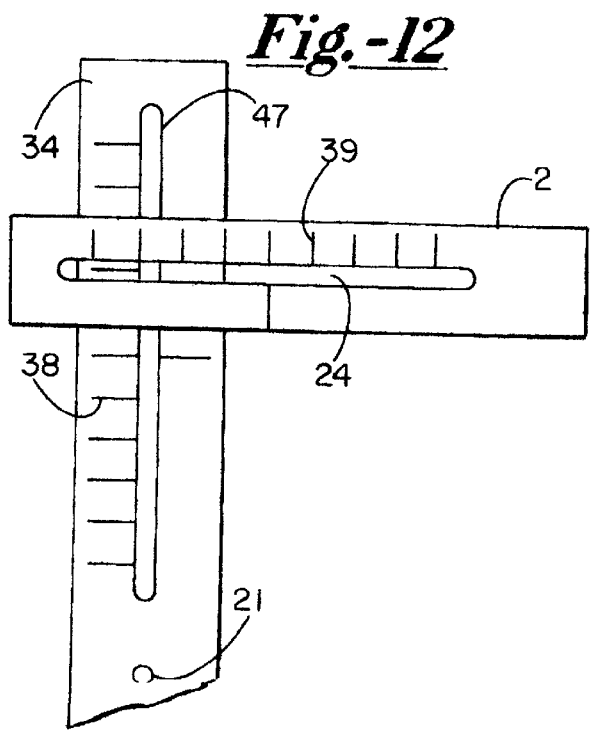
FIG. 12 is an elevational view, showing the left extension lever attached to the push arm with the adjustable slide plates removed.

FIG. 12 illustrates the connection of the left extension lever 34 to the push arm 2, and panning about its center of panning rotation 21. For better understanding, the connecting hardware is not shown.

Figure 13:
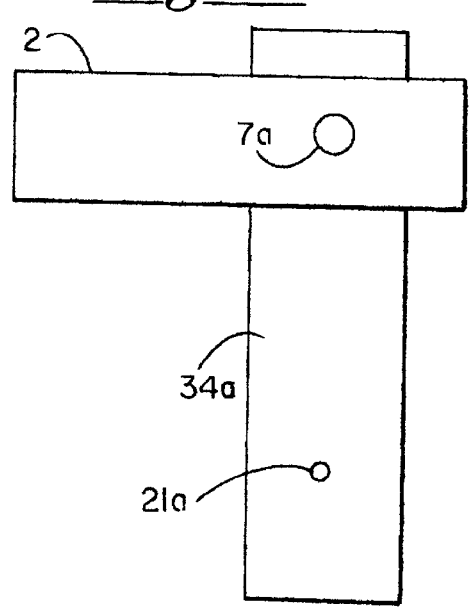
FIG. 13 is an elevational view, showing the right extension lever attached to the push arm.

FIG. 13 shows the corresponding extension lever 34a for the right camera 12, which preferrably has a non-adjustable pivot pin 7a. The lever 34 rotates around its center of panning rotation 21a.

FIG. 14 is an elevational view showing a closeup of the adjustable slide plate 36 which slidingly fits about push arm 2, and rests on top of grommet washer 33 to provide smooth pivoting of push arm 2 and extension lever 34, around pin 7 (when the cameras are panned). Tension knobs 31 and 32 lock-down the adjustable slide plates 36 and 35, respectively, once the position adjustments of push arm 2 over extension lever 34 have been made.

FIG. 15 is a view similar to that shown in FIG. 14, showing the adjustable slide plate 35 with pin 7 fitting into it through the grommet washer 33.

Figure 16:
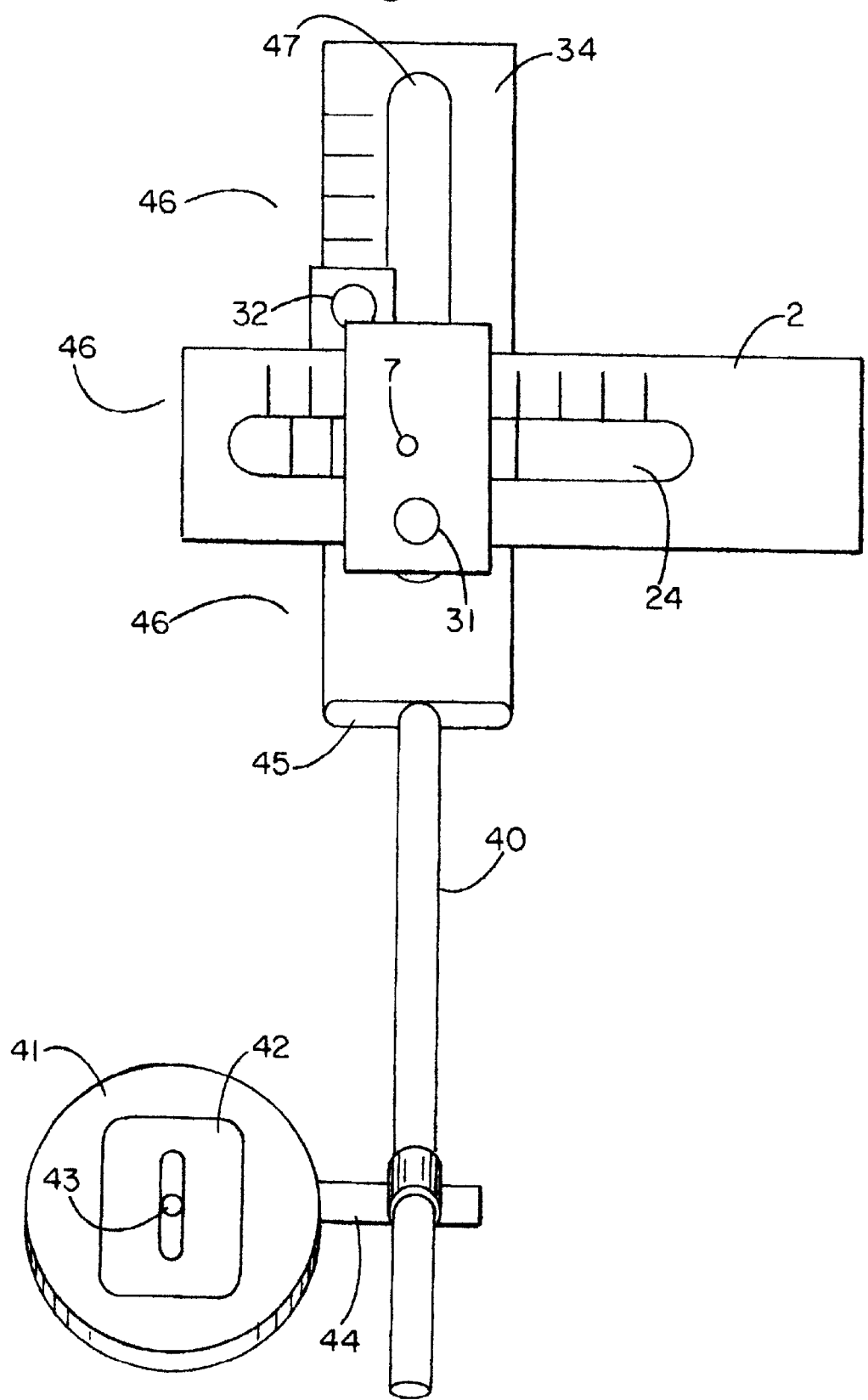
FIG. 16 is an elevational view, illustrating the extension levers and push arm attached to an existing tripod pan/tilt head.

FIG. 16 illustrates the apparatus of this invention attached to a standard tripod pan/tilt head 41, showing the control mechanism, the assembly 46 of the extension lever 34 and the push arm 2, for the left camera 11. The corresponding control mechanism of the right camera 12 counterpart attaches to a second tripod pan/tilt head in the same manner. The connection point 45, which may be a standard machined screw connection, of adapter shaft 40, sized and adapted to fit into the control handle socket 44 typically found on most commercially available tripod heads.

The camera tripod pan/tilt head 41 includes the camera base plate 42 and the camera mounting screw 43. To accommodate a variety of sizes of control handle socket 44 typically found on commercial and consumer tripods, several sizes of adapter shafts 40 are provided with the apparatus of this invention suitable for every tripod head.

Figure 17:
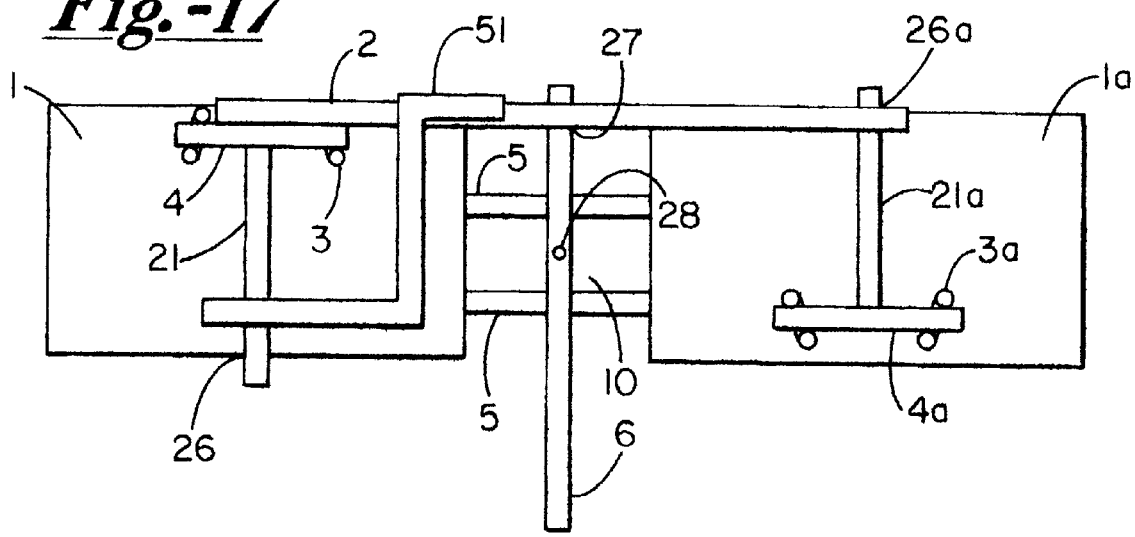
FIG. 17 is an elevational view showing the invention with a reversing push arm extension lever, but without cameras or mounting plates.

FIG. 17 shows the optional motion reversing push arm extension lever 51 as it attaches to the left side of push arm 2 to the left camera panning mechanism framework 4. The framework 4 is seen pointing in the opposite direction as the right camera panning mechanism framework 4a. The function of the optional motion reversing push arm extension lever 51 is to allow the left camera to be pointed in the opposite direction as the right camera for situations when the logistics of a shot or scene make it easier to configure the cameras this way.

Figure 18:
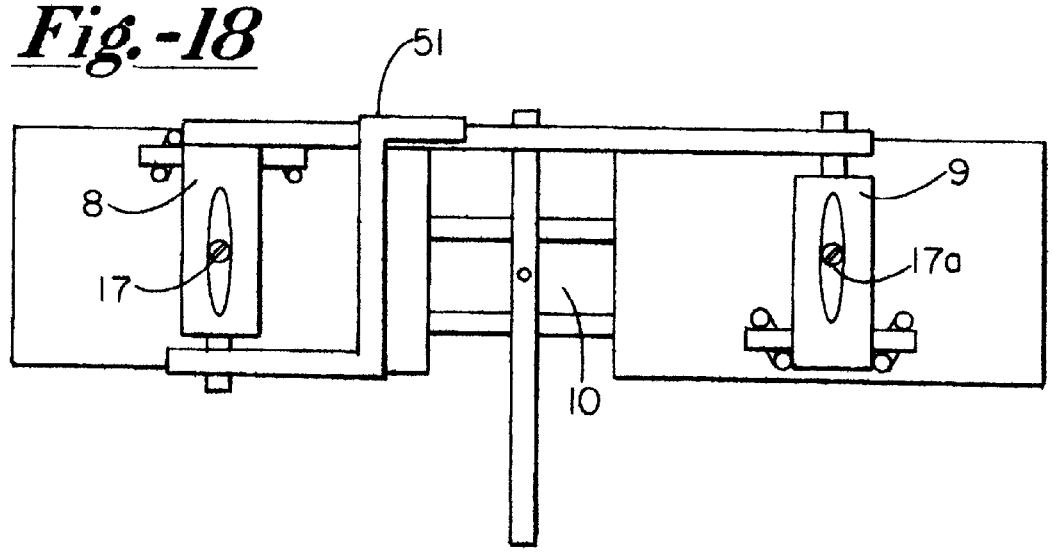
FIG. 18 is similar to FIG. 17, but also showing the mounting plates.

FIG. 18 shows the same view with the addition of camera mounting plates 8 and 9.

Figure 19:
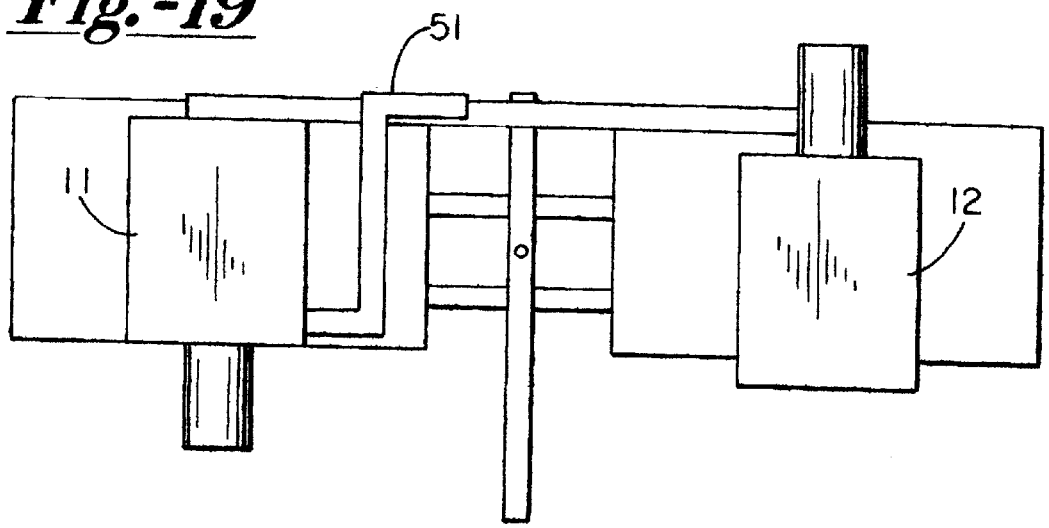
FIG. 19 is similar to FIG. 17, but also showing the cameras in place on mounting plates.

FIG. 19 shows the addition of the cameras, with the right camera 12 pointing forward and the left camera 11 pointing backward. When this invention is operated in this manner with the motion reversing push arm extension lever 51 in place, when the control handle 6 is turned to the right, the right camera 12 pans left (while facing forward) and the left camera 11, which would be mounted upside-down, pans to the right with respect to the invention. The camera 11 is mounted upside-down so that the image pans to the left just like the right camera 12, again achieving the motion matching this invention was designed to do.

Figure 20:
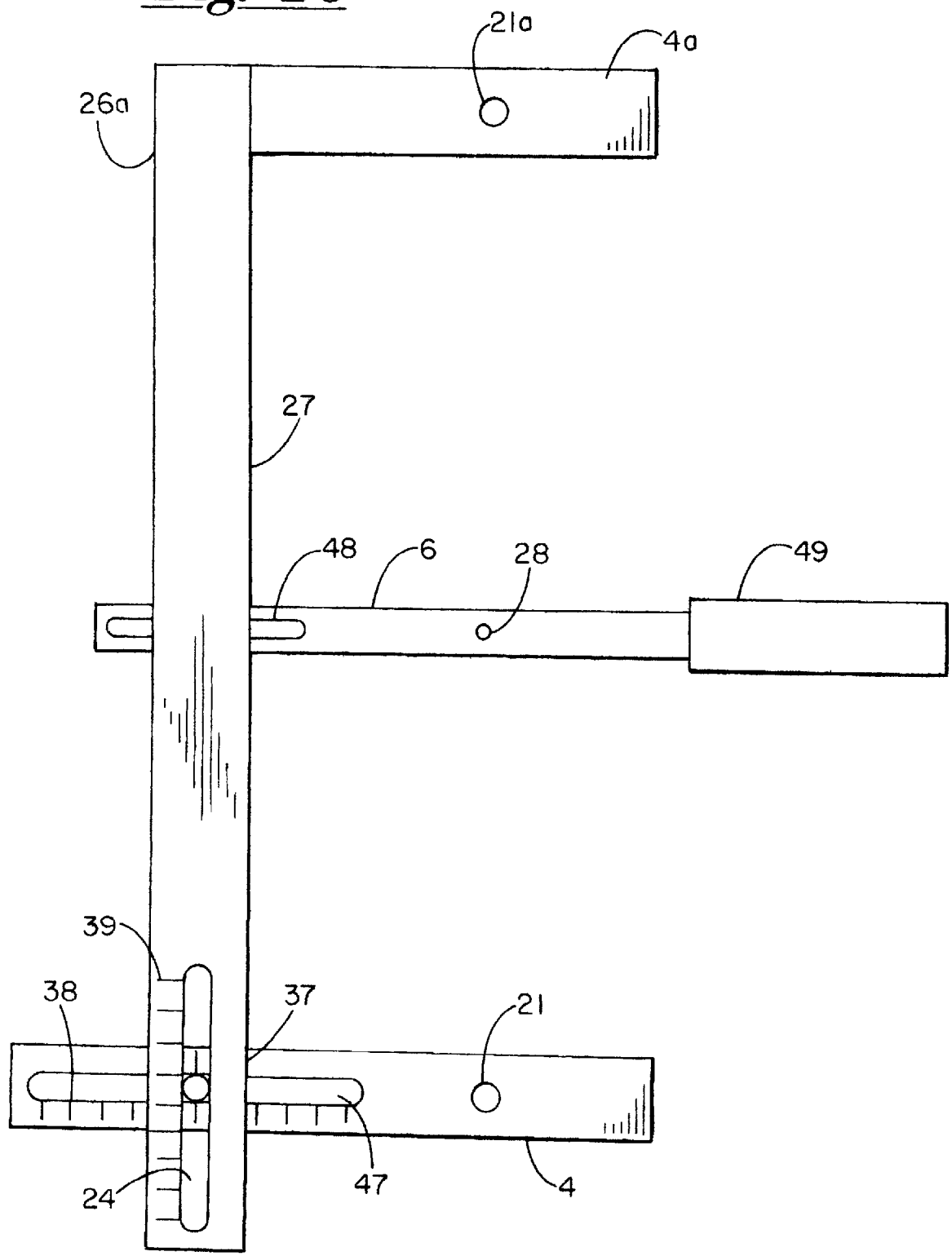
FIG. 20 is an elevational view showing the right and left camera panning mechanism frameworks and the control handle connected via the push arm.

FIG. 20 illustrates the reason for the sliding pivot joint 27, which slides along slit 48, to allow the push arm 2 to move freely when the user makes an adjustment on the left camera's pan rate, by changing the position of pan rate adjuster 46 (composed of parts 7, 31, 32, 33, 35, 36, 37 as shown and described in FIGS. 4, 10, 11, 15 and 16). If a user wishes to speed up or slow down the pan rate of the left camera with respect to the right camera, this is accomplished through simple mechanics, namely lever-arm or gear ratio methods. In this drawing pan rate adjuster 46 is indicated only as pivot point 37 (which is also the hole for pin 7). As the pan rate adjuster 46/pivot point 37 is moved away from camera pan axis 21 the left camera pans slower. When pan rate adjuster 46/pivot point 37 is moved closer to camera pan axis 21 the left camera pans faster.

Figure 21:
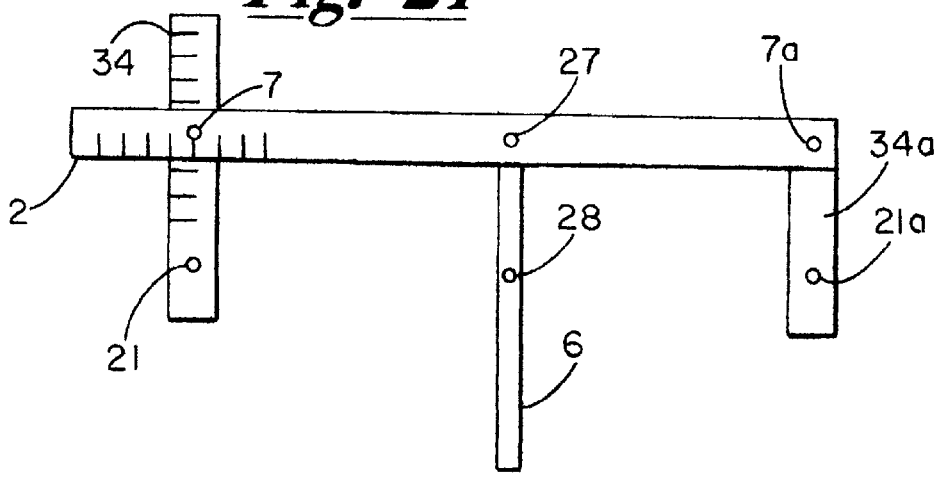
FIG. 21 is an elevational view similar to FIG. 20 with the left camera panning mechanism framework positioned relative to the sliding push arm to equate the panning rates of the left and right cameras.
Figure 22:
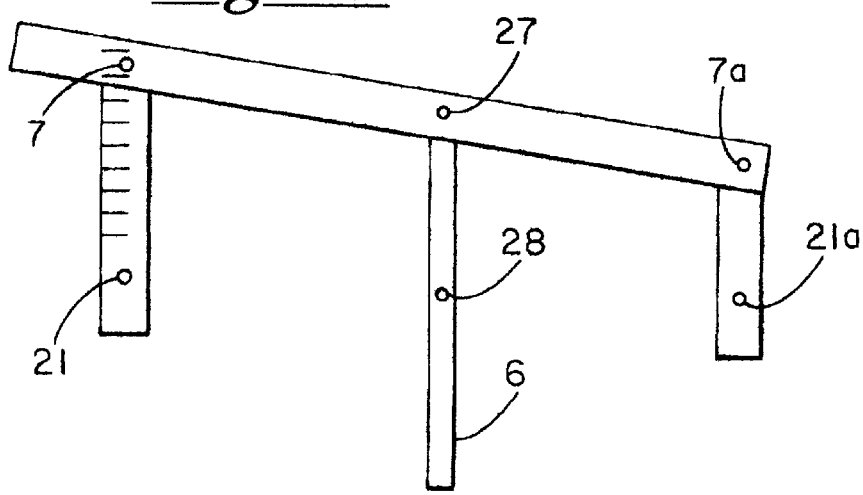
FIG. 22 is an elevational view similar to FIG. 20 with the push arm and left camera panning mechanism framework positioned to slow the left camera pan rate relative to the right camera pan rate.
Figure 23:
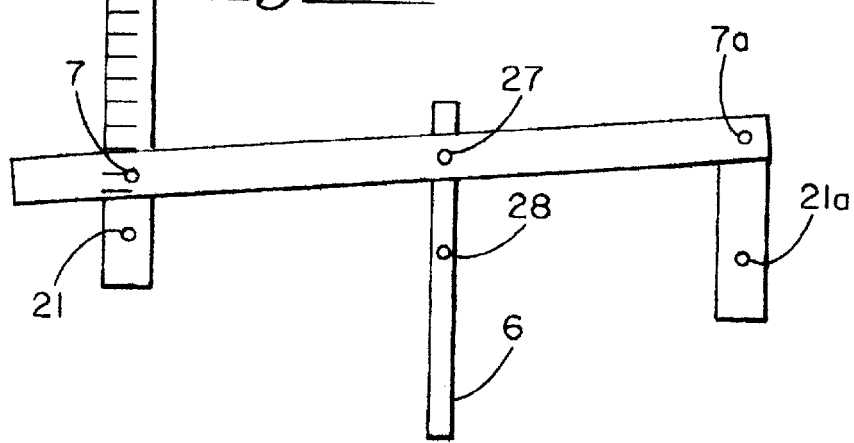
FIG. 23 is an elevational view similar to FIG. 20 with the push arm and left camera panning mechanism framework positioned to increase the left camera pan rate relative to the right camera pan rate.

FIG. 21–23 are partial elevational views showing the reason for a sliding pivot joint 27 when the user decides to adjust the pan rate of the left side of the unit. This adjustment is done by sliding push arm 2 (and pivot point pin 7) away from or toward left panning axis of rotation 21.

In FIG. 21, pivot pins 7 and 7a are equidistant from left and right panning axis of rotation 21 and 21a. In this configuration both cameras would pan at the same rate. In FIG. 22, push arm 2 is pushed away from left panning axis of rotation 21 decreasing the left camera pan rate. In FIG. 23 push arm 2 is moved closer to left panning axis of rotation 21 increasing the left camera pan rate.

In order to make this adjustment of push arm 2, it is preferable for a sliding joint 27 to be used because rotation points 21, 28, and 21a are fixed axes, and pivot pin 7a is a rotational joint. To rotate the left end of push arm 2 about pivot pin 7a it is useful that a slit be in control handle 6 to allow this movement at sliding joint 27.

Turning now to function as shown in FIGS. 21–23, the actual function of the adjustable pivot point 7 of the left camera 11 is now further explained. FIG. 21 shows a partial elevational view of the extension levers 34 and 34a of the camera panning mechanism attached to the push arm 2, with the control handle 6 in a neutral or cameras-straight-forward-position. The adjustable pivot point 7 is in a neutral position, which will provide exact corresponding panning movement between both cameras when control handle 6 is pushed in either direction. The adjustability of this pivot point 7 can be compared to the adjustability of the gears of a 5-speed bicycle, in which the rotation ratio between the front and back wheels and the front gear is dependent on which of the five back wheel gears is engaged. The action of adjusting pivot point 7 changes the relative panning rates between the left and right cameras 11, 12, in much the same way as changing gears on a 5-speed bicycle. The purpose of changing the relative position of the pivot point 7 is to allow the operator to vary the panning speeds of the left and right cameras 11, 12 when it is desired to change the zoom of one camera and not the other, while still maintaining the apparent foreground/background image lock, which the apparatus of this invention allows. This adjustment is necessary, for example in FIG. 22, when the operator wishes to zoom-out the right camera 12 view of the foreground subject, making the subject smaller in the screen, and still keep the background image from the left camera 11 the same size. It is therefore necessary to decrease the panning rate of the background or left camera 11. The method of the adjusting pivot point 7 between the connecting sliding plates, that is, the push bar 2 and the extension lever 34, has already been explained previously in reference to FIGS. 10, 11 and 14–16. Adjusting the pivot point 7 of the right camera 12 farther from the panning axis 21, as illustrated in FIG. 22, will cause the left camera 11 to pan more slowly than the right camera 12. As illustrated in FIG. 23, adjusting the pivot point 7 of the left camera 11 closer to the panning axis 21, will allow the right camera 12 to zoom in on a foreground subject, to make the subject larger in the screen and still keep the background image from the left camera 11 at the same size. In this way, the panning rate of the background camera is increased.

Figure 24:
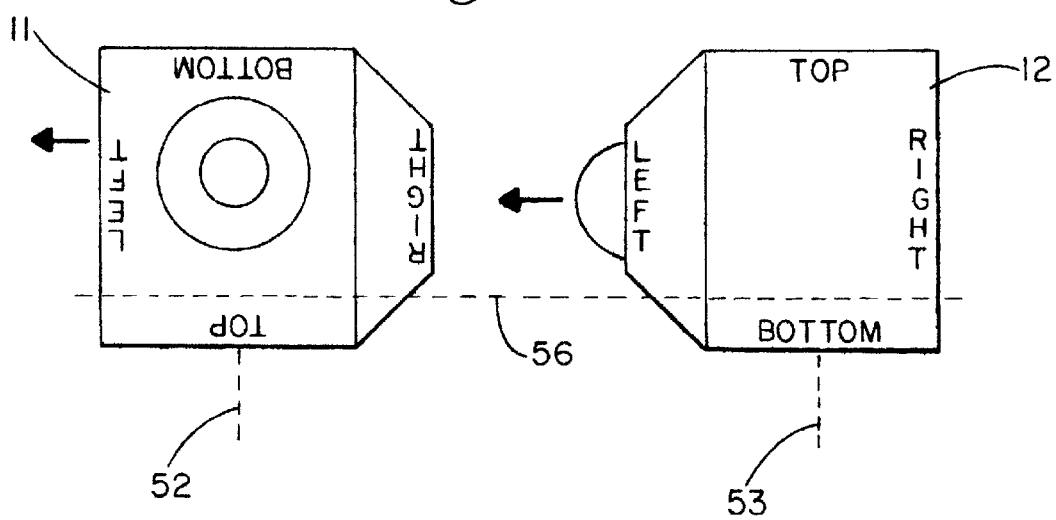
FIG. 24 is a perspective-partial drawing showing just the cameras as oriented for use with the motion reversing push arm attachment as seen from the point of view of the video operator.

FIG. 24 is a perspective schematic drawing showing just the cameras, as seen from the point of view of the video operator. This drawing omits all of the invention, which has been clearly illustrated in many other drawings, and concentrates on the movement and orientation of the two cameras when used in connection with the motion reversing push arm lever 51. One will notice that the left camera 11 is shown mounted upside-down oriented toward the operator (and a background object), while the right camera 12 is mounted normally facing away from the operator (and toward the foreground object). When the right camera 12 pans left along pan axis 53 the left camera 11 also pans left along pan axis 52, because it is mounted upside-down. The reason for mounting this camera upside-down can fully be realized by considering the tilt motion achieved when this invention is mounted on a standard video tripod (as shown in FIG. 6). In FIG. 24, the tilt axis 54 is shown as a dashed line 51. When the invention is mounted on a tripod for the purpose of achieving tilt motion matching, and both cameras face in opposite directions, with the left camera 11 being also mounted upside-down, when the unit is tilted causing the right camera 12 to pan down, the left camera 11 physically tilts up with respect to the studio floor, but left camera 11 tilts toward the bottom of the camera or image. This "double negative" results in both cameras tilting in the same direction. Furthermore, it should be mentioned that the correct use of the invention in this manner would mean that the background object (model, painting, projection, etc.) would also have to be mounted upside-down.

Figure 25:
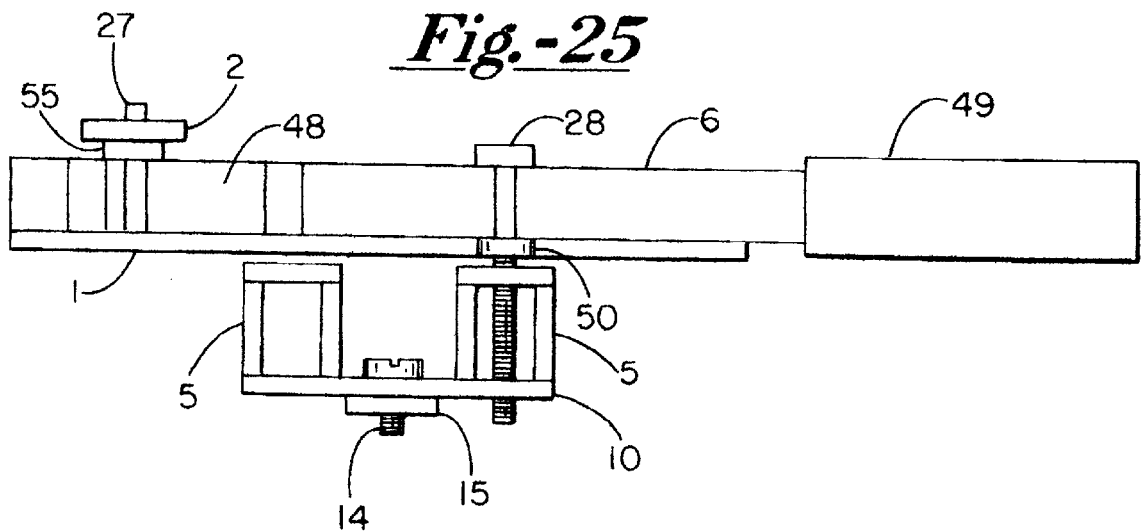
FIG. 25 is a partial cross-sectional view showing the attachment of the control handle to the main framework with the cameras and pan mechanisms removed for clarity.

FIG. 25 is a cross-sectional view of control handle 6 with handgrip 49. FIG. 25 illustrates how control handle 6 attaches to the main framework, with cameras and pan mechanisms removed for clarity. Pivot pin 28 holds control handle 6 by passing through and connecting to base plate 1, rear bar 5 and base plate 10. Precision washer 50 decreases the friction when control handle 6 is turned left or right. The front end of control handle 6 is connected with push arm 2 via sliding pivot joint 27, which is comprised of a pin which passes through the front of control arm 6 and precision washer 55. The cutaway view of this area shows sliding slot 48 in which pin 27 slides forward and back as control handle 6 is panned left and right.

Although the present invention has been described with reference to preferred embodiments, workers skilled in the art will recognize changes may be made in form and detail without departing from the basic function, spirit and scope of the invention.

I claim:

1. A dual camera image matching apparatus comprising:
    a support frame;
    a plurality of camera mounting means for supporting a camera for pan/tilt motion, each camera mounting means having a distal and a proximal end, each camera mounting means pivotally attached to the support frame;
    a push arm extending between the camera mounting means and pivotally attached to each camera mounting means; and
    a control handle joined to the push arm.

2. The apparatus of claim 1, wherein the support frame has a mounting plate beneath each camera mounting means, each mounting plate designed and adapted for attachment to a camera tripod.

3. The apparatus of claim 1, wherein each camera mounting means is provided with camera distance adjustment means, adapted and designed for supporting each camera at an independently selected distance with reference to the support frame.

4. The apparatus of claim 1, further comprising:
    at least one panning means for panning a camera, the panning means supporting the camera mounting means.

5. The apparatus of claim 4, wherein each camera panning means is a friction head panning means.

6. The apparatus of claim 4, wherein each camera panning means is a fluid head panning means.

7. The apparatus of claim 4, wherein each camera panning means is a bearing head panning means.

8. The apparatus of claim 1, wherein the proximal end of each camera mounting means is supported on the support frame by roller assembly means.

9. The apparatus of claim 1, further comprising a plurality of cameras, the cameras mounted on the camera mounting means: and;

each camera mounting means comprising means for selectively adjusting the camera position with respect to the camera mounting means proximal and distal ends.

10. The apparatus of claim 1 and further comprising:

a camera mounted on each camera mounting means;

a first end and a second end of the support frame, whereby movement of the handle toward the support frame first or second ends causes simultaneous synchronous movement of the cameras.

11. The apparatus of claim 1, wherein the support frame is supported on a tripod.

12. The apparatus of claim 1 and further provided with a pair of still photographic cameras, the cameras being mounted to the camera mounting means.

13. The apparatus of claim 1 and further provided with a pair of motion picture cameras, the cameras being mounted to the camera mounting means.

14. The apparatus of claim 1 and further provided with a pair of video cameras, the cameras being mounting to the camera mounting means.

15. The apparatus of claim 1, further comprising:

a first camera;

the camera mounting means comprising a first camera mounting means, the first camera mounted to the first camera mounting means; and the first camera mounting means comprising means for selectively adjusting the position of the first camera attached to the first camera mounting means with respect to the first camera mounting means proximal and distal ends.

16. The apparatus of claim 1, wherein the push arm comprises first and second ends and means for selectively adjusting the position of a camera with respect to first and second ends of the push arm.

17. The apparatus of claim 15, wherein the push arm comprises first and second ends and means for selectively adjusting the position of the first camera with respect to first and second ends of the push arm.

* * * * *